United States Patent

Voronin et al.

[15] 3,650,197
[45] Mar. 21, 1972

[54] APPARATUS FOR CONTROLLING AIR PRESSURE INSIDE THE CABIN OF AN AIRCRAFT

[72] Inventors: Grigory Ivanovich Voronin, Ploschad Vosstania, 1, kv. 447; Mikhail Ivanovich Vzorov, 1 ulitsa Yamskogo polya, 24, kv. 34; Ilya Lvovich Karasik, ulitsa Festivalnaya, 14, korpus 2, kv. 318; Jury Dmitrievich Lyagushkin, ulitsa Lavochkina, 48, korpus 2, kv. 496; Leonid Yakovlevich Perepletchikov, ulitsa Dm. Ulyanova, 9/11, korpus 2, kv. 42; Nina Dmitrievna Khokhlova, Prospekt Mira, 45, kv. 12; Jury Mikhailovich Petrov, ulitsa B. Cherkizovskaya, Kvartal 8/11, korpus 20, kv. 44, all of Moscow, U.S.S.R.

[22] Filed: Sept. 16, 1969

[21] Appl. No.: 858,435

[52] U.S. Cl. ................................................98/1.5
[51] Int. Cl. ........................................B64d 13/00
[58] Field of Search ...................................98/1.5

[56] References Cited

UNITED STATES PATENTS

| 2,754,745 | 7/1956 | Arthur | 98/1.5 |
| 3,389,553 | 6/1968 | Hardy et al. | 98/1.5 |

*Primary Examiner*—Meyer Perlin
*Assistant Examiner*—Ronald C. Capossela
*Attorney*—Waters, Roditi, Schwartz & Nissen

[57] ABSTRACT

An apparatus for controlling air pressure inside the cabin of an aircraft, the cabin being provided with a means for supplying pressurized air thereinto and an air-operated valve, installed in the path of communication of the cabin with the atmosphere and controlled by a governor, the valve being so adapted to open in case there is no control signal and to close under the action of this signal.

1 Claim, 1 Drawing Figure

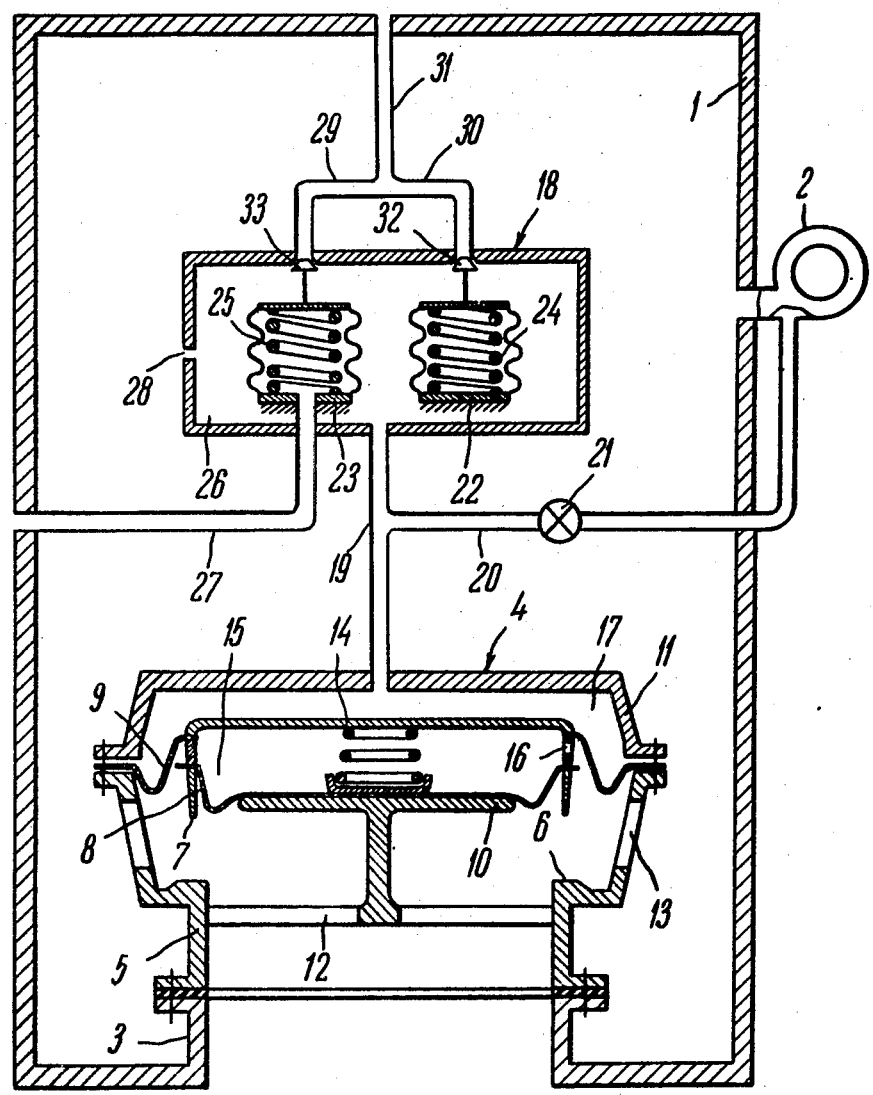

APPARATUS FOR CONTROLLING AIR PRESSURE INSIDE THE CABIN OF AN AIRCRAFT

The present invention relates to aircraft, and, more particularly, it relates to an apparatus for controlling air pressure inside the cabin of an aircraft.

Known in the art is apparatus for controlling the pressure of the air inside the cabin of an aircraft, this cabin being provided with means for forced supply of pressurized air thereinto, such means being, for example, a self contained supercharger. In some cases, the intermediate stages of the aircraft turbine compressor are used as such means.

One known system for controlling air pressure inside the cabin of an aircraft includes an air-operated valve adapted to control fluid communication between the cabin and ambient atmosphere. This valve, in its turn, has its operation controlled by an air pressure governor including means responsive to the absolute pressure and gauge pressure values inside the cabin. The closing element of this air-operated valve is operatively connected with two resilient diaphragms one of which responds to the action of a pressure differential between a control pressure signal from said governor and the air pressure inside the cabin, while the other one is adapted to respond to a pressure differential between the air pressure inside the cabin and that of the ambient atmosphere. The closing element of the valve is acted upon by a compression spring biasing it toward its seat. This above-mentioned apparatus provides for maintaining inside the cabin the value of air pressure, which is either equal to that of the ambient atmosphere pressure (at ground level or at comparatively low altitudes), or slightly exceeds the value of the ambient atmospheric pressure (at comparatively great altitudes, so that a pressure differential of some magnitude is established therebetween); see, for example, the Catalogue issued by the Normalair Ltd., Great Britain.

However, when apparatus of the above described known type are operated, certain complications are encountered in some practical cases. The above-mentioned air-operated valve being closed by the action of its biasing spring, prior to the means for forced supply of pressurized air into the cabin being operated, there exists a tendency of an increased air pressure being established inside the cabin after the operation of this means has been started, due to a certain degree of inertia in the operation of this known apparatus. In such cases both the passengers and the crew of the aircraft are subjected to the unpleasant effects of the increased air pressure.

Moreover, when the aircraft equipped with the above described known apparatus for air pressure control lands under hazardous or emergency conditions, the increased air pressure is maintained inside the cabin for a certain period after the landing, and the excessive pressure impedes opening the doors and hatches of the cabin. Therefore, this known apparatus is usually provided with comparatively complicated devices for forced opening of the air-operated valve.

Besides, the space under one of the resilient diaphragms of the air-operated valve, which is subjected to the action of the control pressure signal, communicates with the space inside the cabin through a nozzle, through which this space is filled with air. This nozzle is subject to clogging in the course of operation, which causes failure of the air-operated valve.

It is an object of the present invention to provide an apparatus for controlling air pressure inside the cabin of an aircraft, which will positively provide for sufficient fluid communication being always established between the cabin and the ambient atmosphere during takeoff and landing, as well as under emergency conditions, without the necessity of using any additional means for the purpose, and which will be reliable in operation.

This object is accomplished in an apparatus for controlling air pressure inside the cabin of an aircraft, said cabin cooperating with means adapted to supply pressurized air thereinto, said apparatus comprising an air-operated valve assembly adapted to control fluid communication between said cabin and ambient atmosphere, and an adjustable air pressure governor, in which apparatus, according to the present invention, said air-operated valve assembly is so constructed and arranged that it opens in the absence of a control pressure signal from said air pressure governor, said air-operated valve assembly being further adapted to close under the action of such control pressure signal coming from said air pressure governor.

In a preferred embodiment of the present invention, said air-operated valve assembly comprises a closing element operatively connected with a pair of resilient diaphragms, one of said pair of diaphragms being adapted to respond to a pressure differential between said control pressure signal and the air pressure inside said cabin, the other one of said pair of diaphragms being adapted to respond to a pressure differential between the air pressure inside said cabin and the air pressure in the ambient atmosphere, said closing element being resiliently biased by a spring member in a direction opposite to the action thereupon of said control pressure signal.

In order to increase the reliability of an apparatus constructed in accordance with the present invention, said air-operated valve assembly is so arranged, said first one of said pair of diaphragms is further adapted to respond to pressure supplied thereto by said pressurized air supply means, the communication between said first diaphragm and said pressurized air supply means being established through a throttling valve.

Given below is a detailed description of a preferred embodiment of the present invention, with due reference being made to the scale figure of the drawing showing schematically an apparatus for controlling air pressure inside the cabin of an aircraft, constructed in accordance with the present invention.

In the drawing, the apparatus for controlling air pressure inside a cabin 1 of an aircraft (not shown) includes means 2 for supplying air under pressure. The cabin 1 communicates with ambient atmosphere through a branch pipe 3 having mounted thereon an air valve assembly 4 adapted to control the amount of air passing through said branch pipe 3.

The housing 5 of the valve assembly 4 is secured to the branch pipe 3. Disposed adjacent to the bottom portion of the housing 5 is a valve seat 6 cooperating with a closing element 7. Two resilient diaphragms 8 and 9 made of rubber-impregnated capron fabric are secured to the closing element 7. The diaphragm 8 has its central portion bearing upon a support disc 10 which is made integral with the valve housing 5, whereas the diaphragm 9 has its peripheral marginal portion clamped between the adjacent flange of the housing 5 and the bottom flange of a lid 11. The internal space of the valve housing 5 communicates with the branch pipe 3 through an opening 12, while with the internal space of the cabin 1 it communicates through ports 13.

Between the element 7 and the disc 10 is disposed a spring 14 which permanently biases the element 7 upwardly, away from the valve seat 6. The space 15 defined by the element 7, the diaphragm 8 and the support disc 10 communicates with the internal space of the cabin 1 through a port 16 made through the wall portion of the element 7 and then through the port 13 in the valve housing 5.

The chamber 17 defined by the lid 11, the diaphragm 9 and the element 7 communicates with a pressure governor 18 through a conduit 19 and it also communicates with the air pressure supply means 2 via a conduit 20 and a throttling valve 21.

The air pressure governor 18 includes a pair of bellows 22 and 23 with springs 24 and 25, respectively. The bellows 22 and 23 are disposed within the internal chamber 26 of the governor 18. The bellows 22 is hermetically sealed, whereas the bellows 23 communicates with ambient atmosphere through a conduit 27. The chamber 26 communicates with the internal space of the cabin 1 through a port 28, and it also communicates with the ambient atmosphere through conduits 29, 30 and 31. The amount of air entering the chamber 26 from the ambient atmosphere through the conduits 29 and 30 (or leaving the chamber 26 therethrough) is controlled by valves 32 and 33 operated, respectively, by the bellows 22 and 23.

When means 2 is operated, air above-atmospheric, or gauge pressure is supplied therefrom into the chambers 26 and 17 through the conduit 20, the throttling valve 21 and the conduit 19.

As the bellows 23 responds to the gauge pressure, while the bellows 22 responds to the absolute pressure, the valves 32 and 33 are operated accordingly by their respective bellows, whereby air is partially bled to the ambient atmosphere through the conduits 29, 30 and 31. The bleeding takes place, until the air pressure inside the chamber 26 reaches a preset value, and this pressure as a control pressure signal is supplied into the chamber 17 where it acts upon the diaphragm 9 which is subjected to the action of the air pressure inside the cabin 1, coming through the ports 13. If the pressure inside the chamber 17 exceeds that inside the cabin 1, the element 7 is driven toward the valve seat 6, against the bias of the spring 14. The flow passage area of the valve assembly 4 decreases correspondingly, and the air pressure inside the cabin 1 is increased. On the other hand, if the air pressure inside the cabin 1 is above that inside the chamber 17, the valve assembly 4 increases its flow passage area. Consequently, the air pressure inside the cabin 1 decreases.

When the aircraft is abruptly descending, the air pressure of the ambient atmosphere may rise above that inside the cabin 1, which in certain cases might even lead to destruction of the cabin.

The herein disclosed apparatus, embodying the present invention, prevents a situation when the air pressure inside the cabin becomes substantially lower than that of the ambient atmosphere. In the case when the air pressure inside the cabin decreases, the atmospheric pressure acts upon the diaphragm 8, driving it upwardly, whereby excessive air is driven from the internal space 15 through the port 16 which establishes communication between the space 15 and the space inside the cabin 1. As the diaphragm 8 is driven upwardly, it pulls the closing element 7 therealong, which action is aided by the spring 14. And communication between the cabin 1 and ambient atmosphere is established.

When the aircraft is descending, and the air supply means 2 is turned off, the compression spring 14 lifts the closing element 7 off its seat, whereby communication between the internal space of the cabin 1 and the ambient atmosphere is established.

As the chamber 17 of the valve assembly 4 communicates with the pressurized air supply means 2 through a throttling valve 21 which is practically traversed by a flow of air, the changes of the throttling valve 21 becoming clogged or otherwise blocked are minimized, which adds to the overall reliability of the performance of the herein disclosed apparatus.

What is claimed is:

1. An apparatus for controlling air pressure inside the cabin of an aircraft comprising means for supplying air under pressure into said cabin, an air-operated valve assembly controlling fluid communication between said cabin and ambient atmosphere, an adjustable air pressure governor means coupled to said valve assembly for selectively producing control pressure signals to operate said valve assembly, said air-operated valve assembly being openable in the absence of a control pressure signal from said air pressure governor means, said valve assembly being closed under the action of such control pressure signal, said air-operated valve assembly comprising a displaceable valve member, two diaphragms operatively connected with said valve member, one of said diaphragms being connected to respond to a pressure differential between said control pressure signal and the air pressure inside said cabin, while the other of said diaphragms is connected to respond to a pressure differential between the pressure inside said cabin and the pressure of ambient atmosphere, means resiliently biasing said valve member in a direction opposite to that of the action thereupon of said control pressure signal, a conduit connected to the pressurized air supply means and to said valve assembly and governor means, said first-mentioned one diaphragm being connected to respond to the pressure supplied by said pressurized air supply means, and a throttle means in said conduit between said one diaphragm and said supply means.

* * * * *